United States Patent
Winstead

(10) Patent No.: US 7,714,774 B2
(45) Date of Patent: May 11, 2010

(54) FALSE LOCK FILTER FOR PULSED RADAR ALTIMETERS

(75) Inventor: Benjamin J. Winstead, Roseville, MN (US)

(73) Assignee: Honeywell International Inc., Morristown, NJ (US)

( * ) Notice: Subject to any disclaimer, the term of this patent is extended or adjusted under 35 U.S.C. 154(b) by 203 days.

(21) Appl. No.: 11/851,038

(22) Filed: Sep. 6, 2007

(65) Prior Publication Data

US 2009/0066559 A1 Mar. 12, 2009

(51) Int. Cl.
*G01S 13/00* (2006.01)
(52) U.S. Cl. ........................ 342/122; 342/175
(58) Field of Classification Search ............... 342/122
See application file for complete search history.

(56) References Cited

U.S. PATENT DOCUMENTS

| | | | |
|---|---|---|---|
| 3,465,339 A * | 9/1969 | Marner | 374/122 |
| 4,241,346 A | 12/1980 | Watson | |
| 4,568,938 A | 2/1986 | Ubriaco | |
| 4,577,192 A | 3/1986 | Wiegand | |
| 4,851,852 A * | 7/1989 | Bjorke et al. | 342/120 |
| 6,407,697 B1 | 6/2002 | Hager et al. | |
| 6,466,067 B2 * | 10/2002 | Matsui | 327/156 |
| 6,522,396 B1 * | 2/2003 | Halmos | 356/5.01 |
| 6,859,165 B2 | 2/2005 | Matsuoka | |
| 6,903,685 B1 | 6/2005 | Arndt et al. | |
| 7,187,321 B2 | 3/2007 | Watanabe et al. | |
| 2005/0064825 A1 * | 3/2005 | Forrester | 455/101 |
| 2007/0030931 A1 | 2/2007 | Arambepola | |

* cited by examiner

*Primary Examiner*—Thomas H Tarcza
*Assistant Examiner*—Timothy A Brainard
(74) *Attorney, Agent, or Firm*—Fogg & Powers LLC

(57) ABSTRACT

A false lock filter circuit for a pulsed altimeter is provided. The circuit includes a low pass filter having a relatively low bandwidth (LBW LPF), a low pass filter having a relatively high bandwidth (HBW LPF) and a false lock controller. The LBW LPF has an input that is coupled to receive a detector output. The HBW LPF has an input that is coupled to receive the detector output. The false lock controller is coupled to receive outputs from the LBW LPF and HBW LPF. Moreover, the false lock controller is configured to sample an output of the HBW LPF and apply a statistical analysis on the samples to determine if a valid target has been detected.

20 Claims, 3 Drawing Sheets

FALSE LOCK FILTER FOR PULSED RADAR ALTIMETERS

BACKGROUND

Altimeters are used to determine distances between an aircraft in flight and the ground or a target. A typical altimeter has a transmitter that transmits a signal at a select frequency toward the target. A gate detector is used to detect the signals reflected off of the target. Based on the knowledge of the rate of travel of the signal and the time that passed between the transmission and the receipt of the reflected signal, the distance from the aircraft to the target can be determined. In a typical altimeter, once a reflected signal is detected as a valid target, the altimeter switches from a search mode to a track mode. In the track mode a narrower gate may be used that focuses on a range around where the target was detected. In the search mode, a low pass filter (LPF) is applied to the gate detector having an absolute or square function to rectify the signal. From the LPF, a signal level can be determined. Every detector system will have an inherent noise level. Hence, a typical system will set a threshold level that is a little above the noise level that indicates when a valid target is detected. A LPF that has a low bandwidth (LBW) is typically used that reduces the fluctuations in the detected noise level and hence provides good sensitivity. Therefore, the threshold that indicates a valid signal can be set very close to the average noise level.

Jamming signals and mutual interference from other altimeters limit the efficiency of the above described altimeter system. Although the LBW LPF provides excellent sensitivity, random high energy noise spikes from jamming signals or mutual interference can cause the gate detector to indicate a target even if one is not present (a false target). The LBW LPF will tend to average a noise spike with the background noise so that the system thinks a valid weak target has been detected. In response to the false target the system will mistakenly switch from the search mode to the track mode.

For the reasons stated above and for other reasons stated below which will become apparent to those skilled in the art upon reading and understanding the present specification, there is a need in the art for an efficient and effective method of preventing the switching from a search mode to a track mode based on false target detections in an altimeter system.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention. In one embodiment, a false lock filter circuit for a pulsed altimeter is provided. The circuit includes a low pass filter having a relatively low bandwidth (LBW LPF), a low pass filter having a relatively high bandwidth (HBW LPF) and a false lock controller. The LBW LPF has an input that is coupled to receive a detector output. The HBW LPF has an input that is coupled to receive the detector output. The false lock controller is coupled to receive outputs from the LBW LPF and HBW LPF. Moreover, the false lock controller is configured to sample an output of the HBW LPF and apply a statistical analysis on the samples to determine if a valid target has been detected.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention allow a receiver or detector to distinguish valid targets based on a measured variation in detected signals over a period of time. This is accomplished with two low pass filters and a false lock filter circuit. One of the low pass filters is a low bandwidth filter (LBW LPF) and the other is a high bandwidth filter (HBW LPF). In the embodiments, the false lock filter circuit performs statistical analysis on an output signal from the HBW LPF to determine if a valid target has been detected. Moreover, embodiments of the present invention provide a radar electronic protection (EP) method for immunity from pulsed jamming signals or other modulated interference sources.

Figure 1:
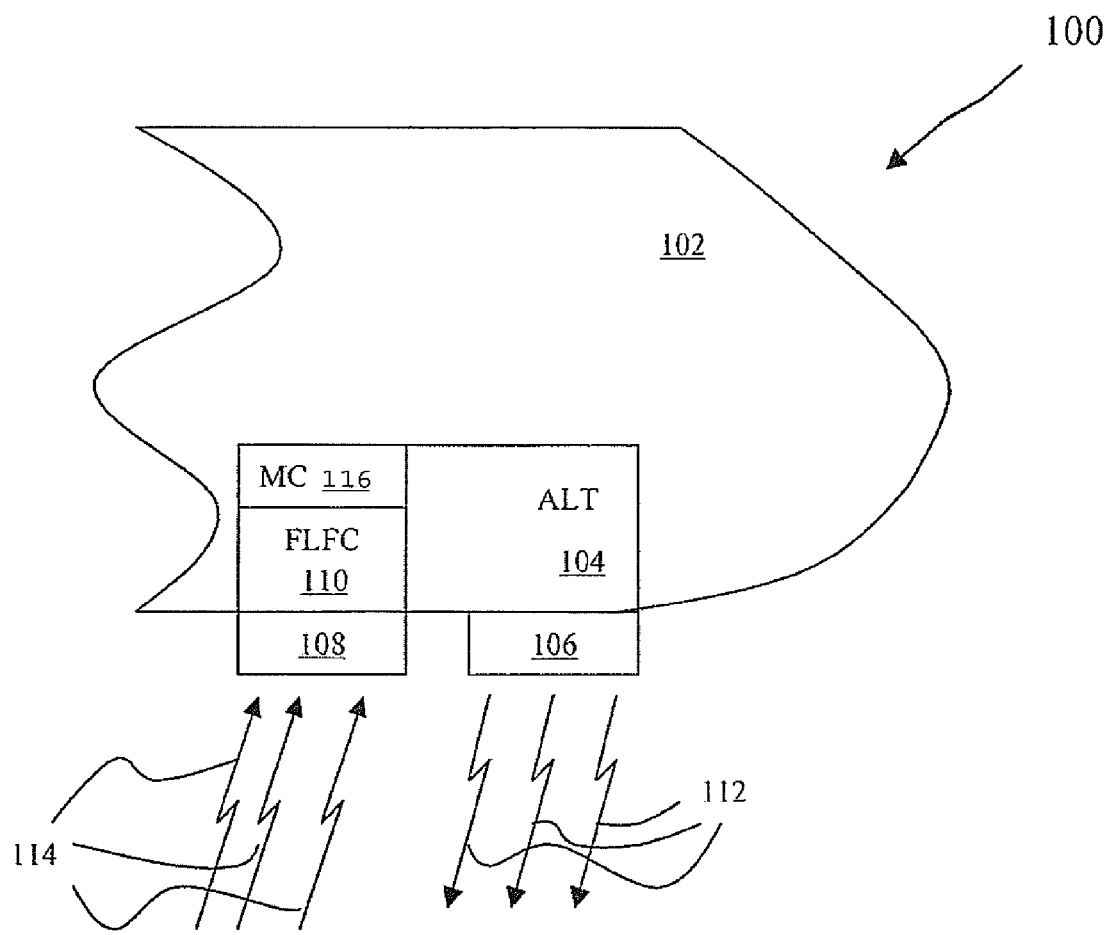
FIG. 1 is an illustration of an aircraft having an altimeter of one embodiment of the present invention.

FIG. 1 illustrates a tracking system 100 that includes an aircraft 102 that has an altimeter 104 of one embodiment of the present invention. The altimeter 104 includes a transmitter 106, a gate detector 108 or receiver 108, a false lock filter circuit 110 and a mode controller 116. The transmitter 106 transmits signals 112 such as pulsed radar signals 112 towards a target. The detector 108 receives or detects reflected signals 114 from the target. The false lock circuit 110 samples signals from LPFs within circuit 110 and performs statistical analysis on the samples to determine if a valid signal has been detected. The FLFC 110 sends a valid target signal to the mode control 116. In response to the valid target signal, the mode controller 116 changes the mode of the altimeter 104 from search mode to track mode.

Figure 2B:
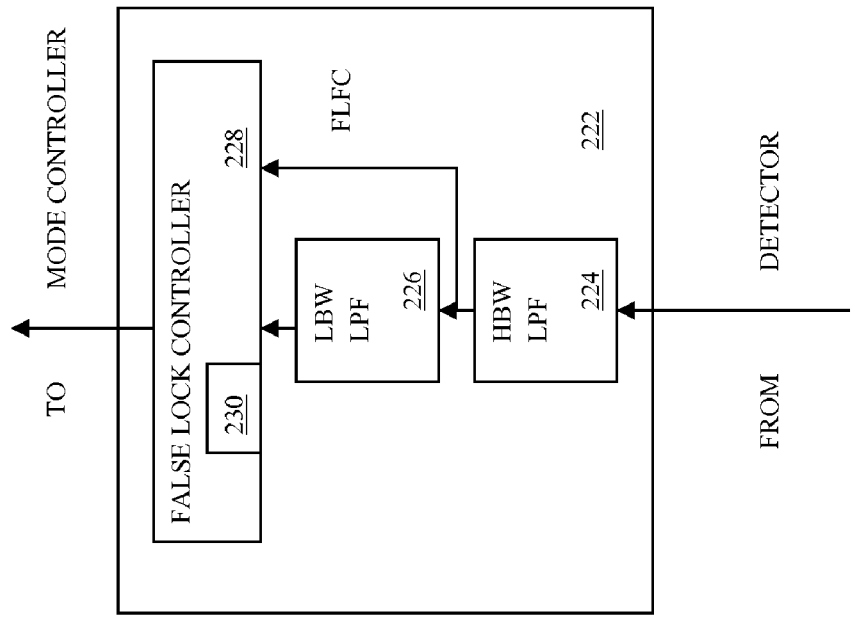
FIG. 2B is a block diagram of a false lock filter circuit of another embodiment of the present invention.
Figure 2A:
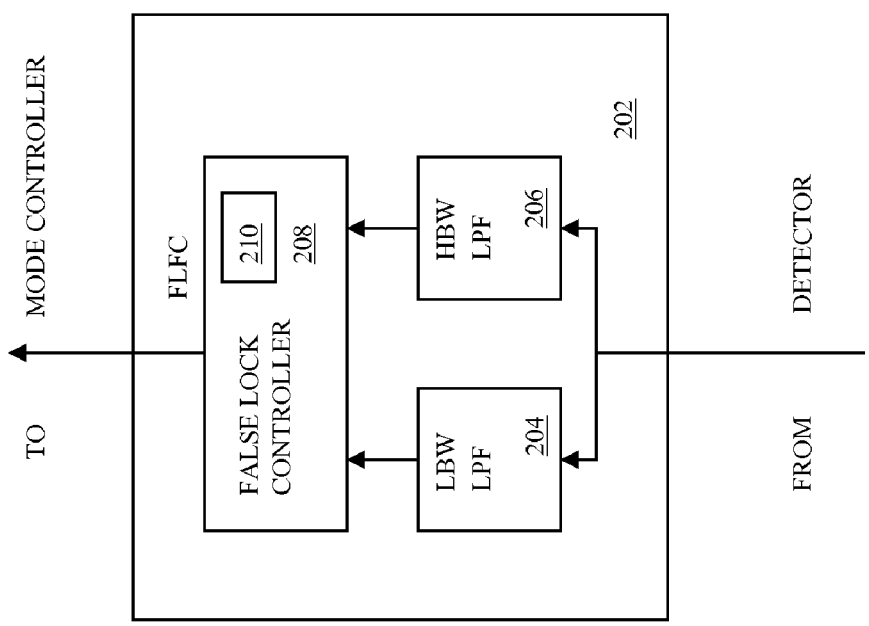
FIG. 2A is a block diagram of a false lock filter circuit of one embodiment of the present invention.

Referring to FIGS. 2A and 2B embodiments of FLFC 202 and 222 are provided. The first embodiment is illustrated in FIG. 2A. As illustrated, this embodiment includes a LBW LPF 204 that is connected in parallel with a HBW LPF 206. Outputs of LBW LPF 204 and HBW LPF 206 are respectfully coupled to the false lock controller 208. The HBW LPF 206 provides signals to the false lock controller 208. Using the signals from the HBW LPF 206, the controller determines if a valid target has been detected. The HBW LPF 206 is used to determine noise spikes because signals coming out tend to fluctuate more than from a LBW LPF. In particular, the HBW LPF 206 outputs higher frequency components so that the spikes will come out as stronger signals in the time frame being monitored. This is unlike the slower LBW LPF 204 which will tend to average out the spikes over the period being monitored. As illustrated in FIG. 2A the output from a detector is coupled to both the LBW LPF 204 and the HBW LPF 206 in this embodiment.

In an embodiment, the false lock controller 208 takes a plurality of samples over a given time period of the output signal of the HBW LPF 206. The rate in which the output is monitored is dependant on bandwidth. For a wider bandwidth, a faster time to sample is used. A threshold is set that is representative of a sample level that would indicate the weakest trackable valid target. In one embodiment, the valid target threshold is set using a standard deviation where there is an equal probability that half the sample values would be below the set value and half would be above the set value for a weak trackable target. The noise sample value level can also be set using a standard deviation.

As stated above, the false lock controller 208 takes a plurality of samples of the HBW LPF 206 output over a set period of time. The level of each sample is compared to the valid target threshold. The number of samples below as well as the number of samples above the valid target threshold is tracked. In one embodiment, at the end of the period of time the percentage of samples above the valid target threshold is determined. If this percentage is above a predefined percentage, a valid target is determined to be present and the false lock controller 208 provides a valid target signal to the mode controller. For example, if the predefined percentage is at 30%, any percentage registered above that predefined percentage would indicate a detected valid target. Accordingly, any percentage below the predefined percentage would indicate a false target. Once the percentage is determined, the false lock controller 208 sends a signal to a mode controller based on the determined percentage. In response to the signal from the false lock controller 208, the mode controller selects between the tracking and searching modes of the altimeter. The false lock controller 208 stores the sample values, the thresholds and the select predefined percentages in memory 210 for use.

Although a standard deviation for setting thresholds is discussed above, other methods are contemplated in setting the thresholds. For example, in one embodiment an arbitrary threshold is set based on a desired probability of rejecting a weak valid target or passing an interference signal. For instance, setting a lower signal level threshold or a lower required percentage will result in an increased probability of tracking a false target but will decrease the probability of rejecting a weak valid target. Moreover, as discussed above different thresholds may be used (although they don't have to be) for the HBW LPF and the LBW LPF. The LBW LPF, in one embodiment, is the first LPF monitored during a search until the altimeter detects a possible target. The altimeter then monitors the HBW LPF for a designated period to time to calculate a percentage to determine if the altimeter will transition to track mode.

FIG. 2B illustrates another embodiment, where a HBW LPF 224 is coupled in series with a LBW LPF 226. As illustrated the HBW LPF 224 receives an output from the detector. An output of the HBW LPF 224 is coupled both to the LBW LPF 226 and to the false lock controller 228. An output of the LBW LPF 226 is coupled to the false lock controller 228. An output of the false lock controller 228 is coupled to a mode controller. The false lock controller 228, like the controller 208 of FIG. 2A determines the percentage of samples above a select level that determines a valid target. Although the above embodiments are described as using a percentage above a select value, a percentage below a predefined value could also be used. That is, a select percentage below a select value that indicates a valid target could be used to signal a false target. The embodiment of FIG. 2B also includes a memory 230 in the controller 228 to store the sample values, the thresholds and the select predefined percentages in memory 230 for use. In addition, in one embodiment, the inputs and/or the outputs of the LBW LPF 226 and the HBW LPF 224 are clamped to help avoid increasing the LPF outputs beyond a reasonable level.

Figure 3:
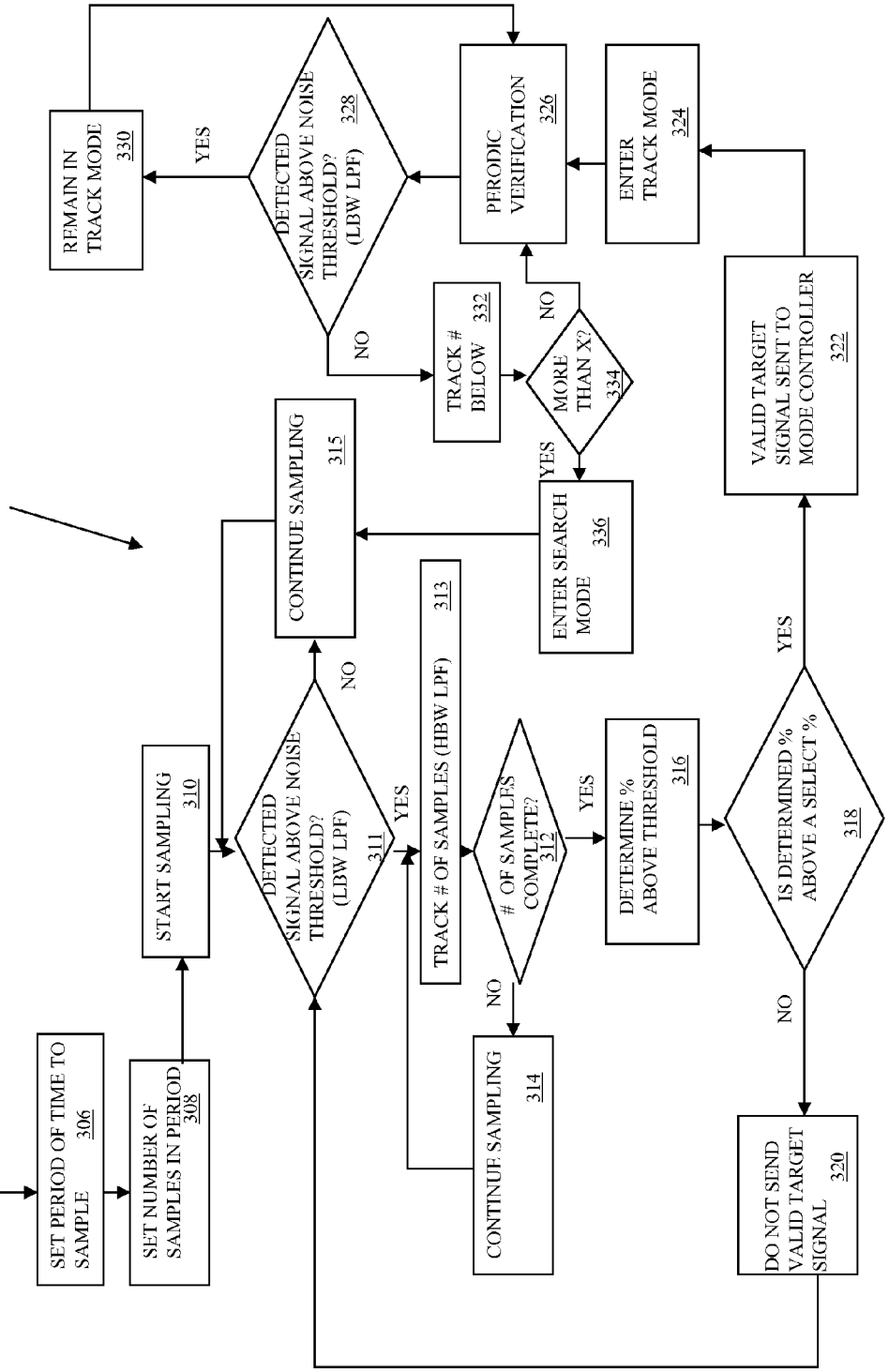
FIG. 3 is a flow diagram of one embodiment of the present invention.

One method of implementing an embodiment is illustrated as a false lock controller flow diagram 300 of FIG. 3. As illustrated, this embodiment starts by setting thresholds for a noise floor and valid targets (304). For example, the noise floor threshold may be at 3 dB above some arbitrary signal level and a valid target threshold may be at 5 dB. The thresholds are selected in one embodiment based on a standard deviation. Statistically, half of an amount of signal samples should occur below and half should occur above if a valid target has been detected. In other embodiments, the thresholds are based on other factors. A time period to take samples is then set (306). The number of samples to take during the time period is set (308). The sampling starts at (310). The sampling includes storing the measured values so they can be used upon completion of the sampling in the period of time. In one embodiment, a verification of a sample with a LBW LPF is used to determine if the sample indicates a signal level above the noise threshold (311). If the sampled signal is not above the noise threshold (311), sampling continues to take place at (315). If the sampled signal is above the noise threshold (311), the number of samples above the valid target threshold as determined by the HBW LPF is tracked (313). The number of samples are monitored and it is determined if all the samples have been taken at (312). If not all the samples have been taken (314), the sampling continues (312).

Once all the samples have been taken in a time period (312), the stored values are processed to determine the percentage of samples within the time period that were above or below the valid signal threshold (316). This determined percentage is compared to a select percentage (318). The select percentage is a percentage that is selected based on the likelihood that a valid signal has been detected. For example, the select percentage could be 30 percent. If the determined percentage is above a select percentage number (318), in one embodiment, it is determined that a valid target has been detected and a valid target signal is sent to the mode controller of the altimeter (322). Hence in the above example, if a determined percentage is above 30 percent, a valid target has been detected. If however, the determined percentage is below the select percentage (318), in this embodiment, a valid target signal is not sent to the mode control of the altimeter (320) and the process continues at (311).

Once a valid target has been sent to the mode controller (322), the altimeter enters into a track mode (324). In one embodiment, a periodic verification is performed (326). Further, in one embodiment, the periodic verification is performed by sampling with the LBW LPF to determine if the signal is above the noise threshold (328). If the sample is above the noise threshold (328), the altimeter remains in track mode (330). If the sample is below or at the noise threshold (328), the number of samples below or at the threshold is tracked (332). If the number of samples below or at the threshold is not more than a select number (334), the periodic verification continues (326). If the number of samples below or at the threshold is more than the select number (334), the altimeter enters into the search mode (336) and the process continues at (315).

The methods and techniques used by the false lock filter circuits 204 as described above can be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs) used in the false lock filter circuit.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A false lock filter circuit for a pulsed altimeter, the circuit comprising:
   a low pass filter having a relatively low bandwidth (LBW LPF) having an input coupled to receive a detector output;
   a low pass filter having a relatively high bandwidth (HBW LPF) having an input coupled to receive the detector output; and
   a false lock controller coupled to receive outputs from the LBW LPF and HBW LPF, the false lock controller configured to:
      sample the outputs of the LBW LPF to detect a first signal above a threshold level;
      sample the outputs of the HBW LPF based on the detection of the first signal;
      compare HBW LPF samples to a defined signal level to determine the percentage of HBW LPF samples on one side of the defined signal level; and
      compare determined percentage with a defined percentage to determine if the first signal is a valid target.

2. The circuit of claim 1, wherein the LBW LPF and the HBW LPF are in a parallel configuration between the detector output and the false lock controller.

3. The circuit of claim 1, wherein the LBW LPF and the HBW LPF are coupled in series with the input of the HBW LPF coupled to the detector output and the output of the HWB LPF coupled to the input of the LBW LPF and a first input to the false lock controller, further an output of LBW LPF coupled to a second input of the false lock controller.

4. The circuit of claim 1, further comprising:
   a memory to store thresholds and sample data.

5. The circuit of claim 1, wherein compare the HBW LPF samples to a defined signal level to determine the percentage of HBW LPF samples on one side of the defined signal level includes determine the percentage of samples for a given period that occur above the defined signal level.

6. The circuit of claim 1, wherein compare the HBW LPF samples to a defined signal level to determine the percentage of HBW LPF samples on one side of the defined signal level includes determine the percentage of samples for a given period that occur below the defined signal level.

7. The circuit of claim 1, further comprising:
   the false lock controller having an output to provide a target verification signal to a mode controller of the altimeter.

8. An altimeter comprising:
   a transmitter to transmit signals;
   a detector configured to detect reflected transmit signals;
   a false lock filter circuit coupled to an output of the detector, the false lock filter circuit including:
      a low pass filter having a relatively low bandwidth (LBW LPF) having an input coupled to receive an output of the detector;
      a low pass filter having a relatively high bandwidth (HBW LPF) having an input coupled to receive the output of the detector;
      a false lock controller coupled to receive outputs from the LBW LPF and HBW LPF, the false lock controller configured to:
         sample outputs of the LBW LPF to detect a first signal above a threshold level;
         sample outputs of the HBW LPF based on the detection of the first signal;
         compare the HBW LPF samples to a defined signal level to determine the percentage of HBW LPF samples on one side of the defined signal level; and
         compare the determined percentage with a defined percentage to determine if the first signal is a valid target; and
   a mode control circuit coupled to receive an output of the false lock controller of the false lock filter circuit.

9. The altimeter of claim 8, wherein the false lock filter circuit further comprises:
   a memory to store thresholds and sample data.

10. The altimeter of claim 8, wherein the LBW LPF and the HBW LPF of the false lock filter are in a parallel configuration between the detector output and the false lock controller.

11. The altimeter of claim 8, wherein the LBW LPF and the HBW LPF are coupled in series with the HBW LPF being coupled to the output of the detector and to the input of the LBW LPF and to the false lock controller and the LBW LPF being coupled between the HBW LPF and the false lock controller.

12. A method of operating an altimeter system, the method comprising:

monitoring the output of a low pass filter having a relatively low bandwidth (LBW LPF) to detect signals above a noise threshold;

monitoring the output of a low pass filter having a relatively high bandwidth (HBW LPF) to detect signals indicative of a valid target;

sampling the output of the HBW LPF over a period of time based on the signals above the noise threshold;

tracking the signal level at each sample; and applying statistical analysis to the tracked sample signal levels to determine if a valid target as been detected.

13. The method of claim 12, further comprising:

selecting between a search mode and a tracking mode of the altimeter based on the statistical analysis.

14. The method of claim 12, farther comprising:

transmitting transmit signals from an aircraft;

detecting signals with a detector; and outputting the detected signals to at least one of the LBW LPF and the HBW LPF.

15. The method of claim 12, further comprising:

setting the noise threshold; and setting a valid target threshold.

16. The method of claim 15, wherein at least one of the noise threshold and the valid target threshold is based on a standard deviation.

17. The method of claim 15, further comprising:

storing the noise threshold, the valid target threshold and tracked sample signal levels in a memory.

18. The method of claim 12, wherein applying statistical analysis to the tracked sample signal levels to determine if a valid target has been detected, further comprises:

determining the percentage of tracked samples having signal levels more than a valid target threshold;

comparing the determined percentage against a set percentage; and based on the comparison, determining if a valid target has been detected.

19. The method of claim 12, wherein applying statistical analysis to the tracked sample signal levels to determine if a valid target has been detected further comprises:

determining the percentage of tracked samples having signal levels less than a valid target threshold;

comparing the determined percentage against a set percentage; and based on the comparison, determining if a valid target signal has been detected.

20. The method of claim 12, further comprising:

verifying the tracking of a valid target periodically by sampling the output of the LBW LPF.

* * * * *